United States Patent
Asakura

(10) Patent No.: US 8,139,235 B2
(45) Date of Patent: Mar. 20, 2012

(54) DATA PROCESSING METHOD, IMAGE PROCESSING APPARATUS AND RECORDING MEDIUM

(75) Inventor: Shinya Asakura, Kawasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 545 days.

(21) Appl. No.: 12/314,302

(22) Filed: Dec. 8, 2008

(65) Prior Publication Data

US 2009/0313433 A1  Dec. 17, 2009

(30) Foreign Application Priority Data

Jun. 17, 2008 (JP) ................................. 2008-157582

(51) Int. Cl.
*G06F 3/12* (2006.01)
(52) U.S. Cl. ....... 358/1.1; 711/162; 358/1.12; 358/1.15; 358/1.18; 358/405
(58) Field of Classification Search .................. 711/162; 358/1.1, 1.12, 1.15, 1.18, 405
See application file for complete search history.

(56) References Cited

U.S. PATENT DOCUMENTS

2006/0087689 A1* 4/2006 Hayashi et al. .............. 358/1.15

FOREIGN PATENT DOCUMENTS

JP  2007-079693 A  3/2007

* cited by examiner

*Primary Examiner* — Jasmine Song
(74) *Attorney, Agent, or Firm* — Buchanan Ingersoll & Rooney PC

(57) ABSTRACT

A data processing method including reading first image processing apparatus structural information by the control unit from a portable storage medium, obtaining second image processing apparatus structural information by the control unit, determining whether to allow data in the storage device to be used or not in the first image processing apparatus by the control unit based on the read first image processing apparatus structural information and the obtained second image processing apparatus structural information and reading the identification information specific to the first image processing apparatus by the control unit from the portable storage medium and storing the read identification information specific to the first image processing apparatus in the storage device by the control unit when the control unit determines to allow the data in the storage device to be used in the first image processing apparatus.

16 Claims, 10 Drawing Sheets

DATA PROCESSING METHOD, IMAGE PROCESSING APPARATUS AND RECORDING MEDIUM

BACKGROUND

1. Field of the Invention

The present invention relates to a data processing method, an image processing apparatus and a recording medium.

2. Description of Related Art

Conventionally, in the image forming apparatus such as printer and the like, there is a case where font data, logo data and the like are used by being stored in the hard disk which is loaded in the apparatus. In many cases, the font data is purchased based on the license contract according to resolution, print speed and the like of the image forming apparatus. For example, there are license modes such as a case where only an output of a predetermined resolution or below is allowed (can be used in an apparatus of 600 dpi, however cannot be used in an apparatus of 1200 dpi etc.), a case where only an output of a predetermined print speed or below is allowed, a case where the installation is allowed only in one apparatus and the like. In such way, the font data is allowed to be used for each image forming apparatus, thus, in general, the hard disk in which the font data is stored is prohibited from being shifted to other apparatus.

However, there is a request to use the data in the hard disk which has been used in the old apparatus as it is in the new apparatus upon model change of the apparatus or the like. Therefore, it is inconvenient when the shifting of the hard disk is totally prohibited. In order to solve this problem, a control to make the hard disk which was loaded in the destination apparatus be continually usable is carried out by an administrator inputting the management password in the destination apparatus of the hard disk when the hard disk is shifted.

Moreover, a technique to recognize the person as a legitimate serviceman and switch to the adjustment mode when a file formed by following a predetermined rule exists in the USB memory at the time when the USB memory which is carried by a serviceman is connected to the image process apparatus is suggested (see JP2007-79693).

However, when the shifting of the hard disk is allowed without limitation after the input of the management password or the authentication of the data in the USB memory is carried out as in the above described techniques, there is a problem that the data in the hard disk is used by ignoring the license content.

SUMMARY

In view of the problems of the above conventional techniques, the object of the present invention is to appropriately determine whether to allow the data in the storage device to be used in the destination image processing apparatus or not when the storage device is shifted between image processing apparatuses.

To achieve at least one of the abovementioned objects, a data processing method reflecting one aspect of the present invention makes a first image processing apparatus allow data in a detachable storage device to be used under a condition that identification information specific to the first image processing apparatus is stored in the storage device when the storage device which is loaded in a second image processing apparatus having a control unit is removed and loaded in the first image processing apparatus, the data processing method comprises reading first image processing apparatus structural information by the control unit from a portable storage medium in which the identification information specific to the first image processing apparatus and the first image processing apparatus structural information are stored, the first image processing apparatus structural information indicating an apparatus structure of the first image processing apparatus, obtaining second image processing apparatus structural information by the control unit, the second image processing apparatus structural information indicating an apparatus structure of the second image processing apparatus itself, determining whether to allow the data in the storage device to be used or not in the first image processing apparatus by the control unit based on the read first image processing apparatus structural information and the obtained second image processing apparatus structural information and reading the identification information specific to the first image processing apparatus by the control unit from the portable storage medium and storing the read identification information specific to the first image processing apparatus in the storage device by the control unit when the control unit determines to allow the data in the storage device to be used in the first image processing apparatus.

Preferably, in the data processing method, the identification information specific to the first image processing apparatus and the first image processing apparatus structural information are stored by the control unit in a non-volatile storage unit which is provided in the second image processing apparatus.

Preferably, in the data processing method, the storing of the identification information specific to the first image processing apparatus and the first image processing apparatus structural information in the portable storage medium is carried out under a condition that a predetermined file for authentication is stored in the portable storage medium in the first image processing apparatus, and the reading of the first image processing apparatus structural information from the portable storage medium by the control unit is carried out under a condition that the file for authentication is stored in the portable storage medium in the second image processing apparatus.

To achieve at least one of the abovementioned objects, a data processing method reflecting one aspect of the present invention makes a first image processing apparatus allow data in a detachable storage device to be used under a condition that identification information specific to the first image processing apparatus is stored in the storage device when the storage device which is loaded in a second image processing apparatus having a control unit is removed and loaded in the first image processing apparatus connected to the second image processing apparatus via a communication network so as to carry out a data communication, the data processing method comprises obtaining the identification information specific to the first image processing apparatus and first image processing apparatus structural information by the control unit from the first image processing apparatus via the communication network, the first image processing apparatus structural information indicating an apparatus structure of the first image processing apparatus, obtaining second image processing apparatus structural information by the control unit, the second image processing apparatus structural information indicating an apparatus structure of the second image processing apparatus itself, determining whether to allow the data in the storage device to be used or not in the first image processing apparatus by the control unit based on the obtained first image processing apparatus structural information and the obtained second image processing apparatus structural information and storing the obtained identification information specific to the first image processing apparatus in the storage device by the control unit when the control unit allows the data in the storage device to be used in the first image processing apparatus.

Preferably, in the data processing method, the identification information specific to the first image processing apparatus and the first image processing apparatus structural information are stored by the control unit in a non-volatile storage unit which is provided in the second image processing apparatus.

Preferably, in the data processing method, the obtaining of the identification information specific to the first image processing apparatus and the first image processing apparatus structural information by the control unit is carried out under a condition that a predetermined file for authentication is confirmed to be stored in a portable storage medium in each of the first image processing apparatus and the second image processing apparatus.

BRIEF DESCRIPTION OF THE DRAWINGS

These present invention will become more fully understood from the detailed description given hereinbelow and the appended drawings, and thus are not intended as a definition of the limits of the present invention, and wherein.

DETAILED DESCRIPTION OF THE PREFERRED EMBODIMENT

First Embodiment

First, the first embodiment of the present invention will be described with reference to FIGS. 1 to 6.

Figure 1:
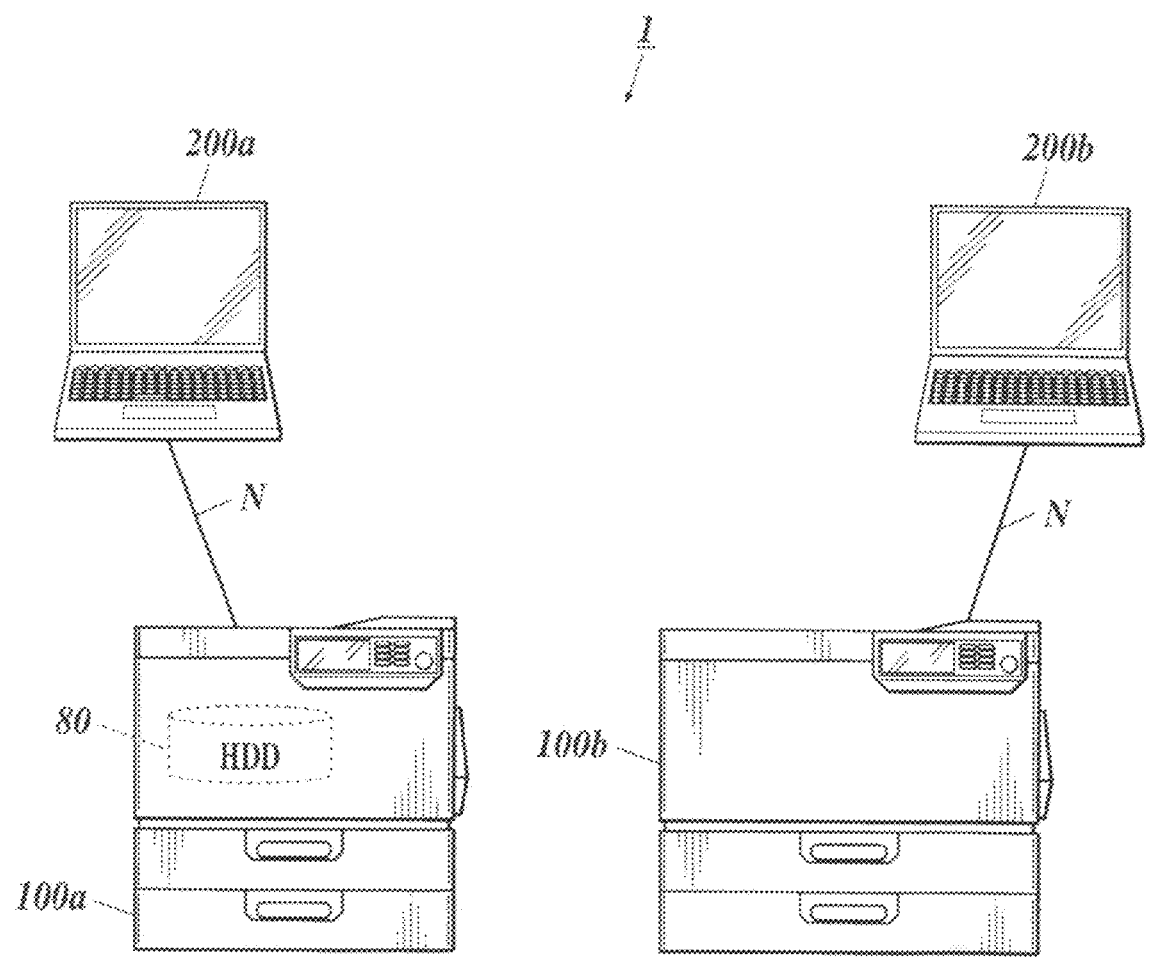
FIG. 1 is a system structural diagram of an image forming system in a first embodiment.

A system structure of the image forming system 1 of the first embodiment is shown in FIG. 1. As shown in FIG. 1, the image forming system 1 comprises image forming apparatuses 100a, 100b as image processing apparatuses and host PCs (Personal Computers) 200a, 200b.

The image forming apparatus 100a is connected with the host PC 200a via the communication network N such as the LAN (Local Area Network) or the like so that data communication can be carried out and forms an image on a paper based on the print data which is transmitted from the host PC 200a. The hard disk (hereinafter, called "HDD (Hard Disk Drive)") 80 is loaded in the image forming apparatus 100a. The image forming apparatus 100b is connected with the host PC 200b via the communication network N such as the LAN or the like so that data communication can be carried out and forms an image on a paper based on the print data which is transmitted from the host PC 200b.

Figure 2:
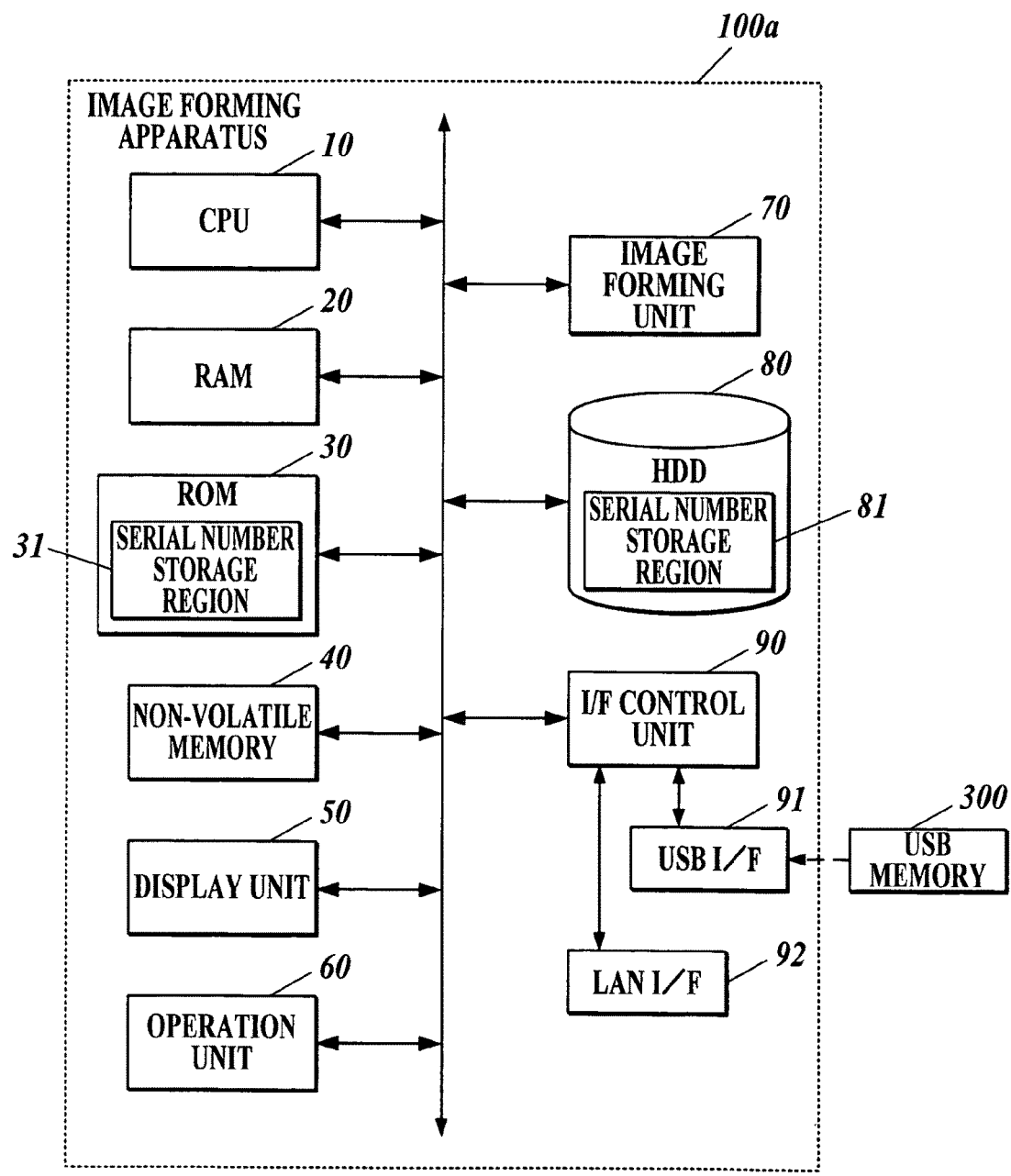
FIG. 2 is a block diagram showing a functional structure of a source image forming apparatus.

The functional structure of the image forming apparatus 100a is shown in FIG. 2. As shown in FIG. 2, the image forming apparatus 100a comprises the CPU (Central Processing Unit) 10, the RAM (Random Access Memory) 20, the ROM (Read Only Memory) 30, a non-volatile memory 40, a display unit 50, an operation unit 60, an image forming unit 70, a HDD 80 and an I/F control unit 90, and the above each unit is connected by a bus.

The CPU 10 integrally controls the processing operation of each unit of the image forming apparatus 100a. Particularly, the CPU 10 reads various types of processing programs stored in the ROM 30 and expands in the RAM 20, and the CPU 10 carries out various types of processes by cooperating with the programs.

The RAM 20 forms a work area which temporarily stores various types of processing programs which are to be executed by the CPU 10 and data according to the programs.

The ROM 30 is constituted of a non-volatile semiconductor memory or the like, and stores various types of processing programs which are to be executed by the CPU 10, various types of data and the like. Further, a serial number as apparatus-specific identification information of the image forming apparatus 100a is stored in the serial number storage region 31 of the ROM 30. For example, the MAC address (Media Access Control address) is used as the serial number.

In the non-volatile memory 40, apparatus structural information, various types of setting information and the like of the image forming apparatus 100a are stored. The apparatus structural information is the information showing the apparatus structure such as specification, product characteristics and the like of the image forming apparatus 100a, and information such as resolution, print speed, color or monochromatic and the like are included.

The display unit 50 is constituted of the LCD (Liquid Crystal Display) and displays various types of display screens and the like according to the instruction of display signal which is input from the CPU 10.

The operation unit 60 comprises various types of keys such as number keys, start key, reset key and the like, and outputs the pushed signal of the key which is pushed to the CPU 10. Further, the operation unit 60 comprises a touch panel which is integrally formed with the display unit 50, and outputs the positional signal to the CPU 10 by detecting the position on the touch panel which is contacted by a finger tip of a user, a touch pen or the like.

The image forming unit 70 is a functional unit including the structural elements which are needed to form an image by using the imaging process of electrographic, electrostatic recording process, thermal transcription formula or the like. For example, the image forming unit 70 comprises a photoreceptor, a transfer belt, a fixing unit, various types of conveyance belt and the like. The image forming unit 70 forms an image on a paper based on the image data according to the instruction of the CPU 10.

The HDD 80 is a storage device which is detachable to the image forming apparatus 100a. Font data which is downloaded, a job which is spooled and the like are stored in the HDD 80. Further, a serial number of the image forming apparatus 100a is stored in the serial number storage region 81 of the HDD 80.

The I/F control unit 90 is a functional unit to control the USB I/F 91 and the LAN I/F 92. The USB I/F 91 is an interface to read data from the USB memory 300. The USB memory 300 is a portable storage medium which is specifically used when moving the HDD 80, and a predetermined file for authentication is stored in the USB memory 300. The LAN I/F 92 is an interface to carry out transmission and receiving of data between an external device such as the host PC 200a and the like.

The CPU 10 of the image forming apparatus 100a controls the image forming unit 70 based on the print data which is received from the host PC 200a via the LAN I/F 92 to form an image on a paper.

The CPU 10 of the image forming apparatus 100a allows the data in the HDD 80 to be used under condition that the serial number of the image forming apparatus 100a is stored in the HDD 80. In particular, the CPU 10 of the image forming apparatus 100a encrypts the serial number which is stored in the serial number storage region 31 of the ROM 30 in advance and stores the encrypted serial number in the serial number storage region 81 of the HDD 80. Then, the CPU 10 of the image forming apparatus 100a reads the serial number from the serial number storage region 81 of the HDD 80 at the time of start-up of the image forming apparatus 100a and compares the read serial number and the serial number stored in the serial number storage region 31 of the ROM 30. When the serial numbers match, the CPU 10 of the image forming apparatus 100a allows the data in the HDD 80 to be used.

When the USB memory 300 is inserted in the image forming apparatus 100, the CPU 10 of the image forming apparatus 100a determines whether the file for authentication is stored in the USB memory 300 or not. The CPU 10 of the image forming apparatus 100a reads the apparatus structural information of the image forming apparatus 100b from the USB memory 300 in which the serial number and the apparatus structural information of the image forming apparatus 100b are stored under condition that the file for authentication is stored in the USB memory 300. Particularly, when the file for authentication if stored in the USB memory 300 and when the file for authentication contains normal matter, the CPU 10 of the image forming apparatus 100a reads the apparatus structural information of the image forming apparatus 100b from the USB memory 300.

The CPU 10 of the image forming apparatus 100a reads and obtains the apparatus structural information of the image forming apparatus 100a from the non-volatile memory 40. Then, the CPU 10 of the image forming apparatus 100a determines whether to allow the data in the HDD 80 to be used in the image forming apparatus 100b or not based on the apparatus structural information of the image forming apparatus 100b read from the USB memory 300 and the apparatus structural information of the image forming apparatus 100a obtained from the non-volatile memory 40. In particular, the CPU 10 of the image forming apparatus 100a compares the apparatus structural information of the image forming apparatus 100b to the apparatus structural information of the image forming apparatus 100a, and determines whether to allow the data in the HDD 80 to be used or not based on the information such as resolution, print speed, color or monochromatic and the like. That is, the CPU 10 of the image forming apparatus 100a determines the adequateness of changing of the HDD 80 whether there is a licensing problem or not when the HDD 80 loaded in the image forming apparatus 100a is shifted to the image forming apparatus 100b and when the data in the HDD 80 is continually used and the adaptability of using the data in the HDD 80 for the image forming apparatus 100b.

For example, conditions such that the data in the HDD 80 is allowed to be used even after the HDD 80 is shifted to the image forming apparatus 100b when the resolution of the destination image forming apparatus 1000b is lower or equal to the resolution of the source image forming apparatus 100a, that the data in the HDD 80 is allowed to be used even after the HDD 80 is shifted to the image forming apparatus 100b when the print speed of the destination image forming apparatus 100b is slower or equal to the print speed of the source image forming apparatus 100a and that the data in the HDD 80 is allowed to be used even after the HDD 80 is shifted to the image forming apparatus 100b when both the destination image forming apparatus 100b and the source image forming apparatus 100a are monochromatic are set in advance.

Here, the CPU 10 of the image forming apparatus 100a may further carry out the above described determination based on the information regarding by which license condition the data (font data and the like) stored in the HDD 80 was downloaded.

When the CPU 10 of the image forming apparatus 100a determines to allow to use the data in the HDD 80 in the image forming apparatus 100b, the CPU 10 of the image forming apparatus 100a reads the serial number of the image forming apparatus 100b from the USB memory 300 and encrypts the serial number to store in the serial number storage region 81 of the HDD 80. Further, the CPU 10 of the image forming apparatus 100a makes the non-volatile memory 40 store the serial number and the apparatus structural information of the image forming apparatus 100b.

Figure 3:
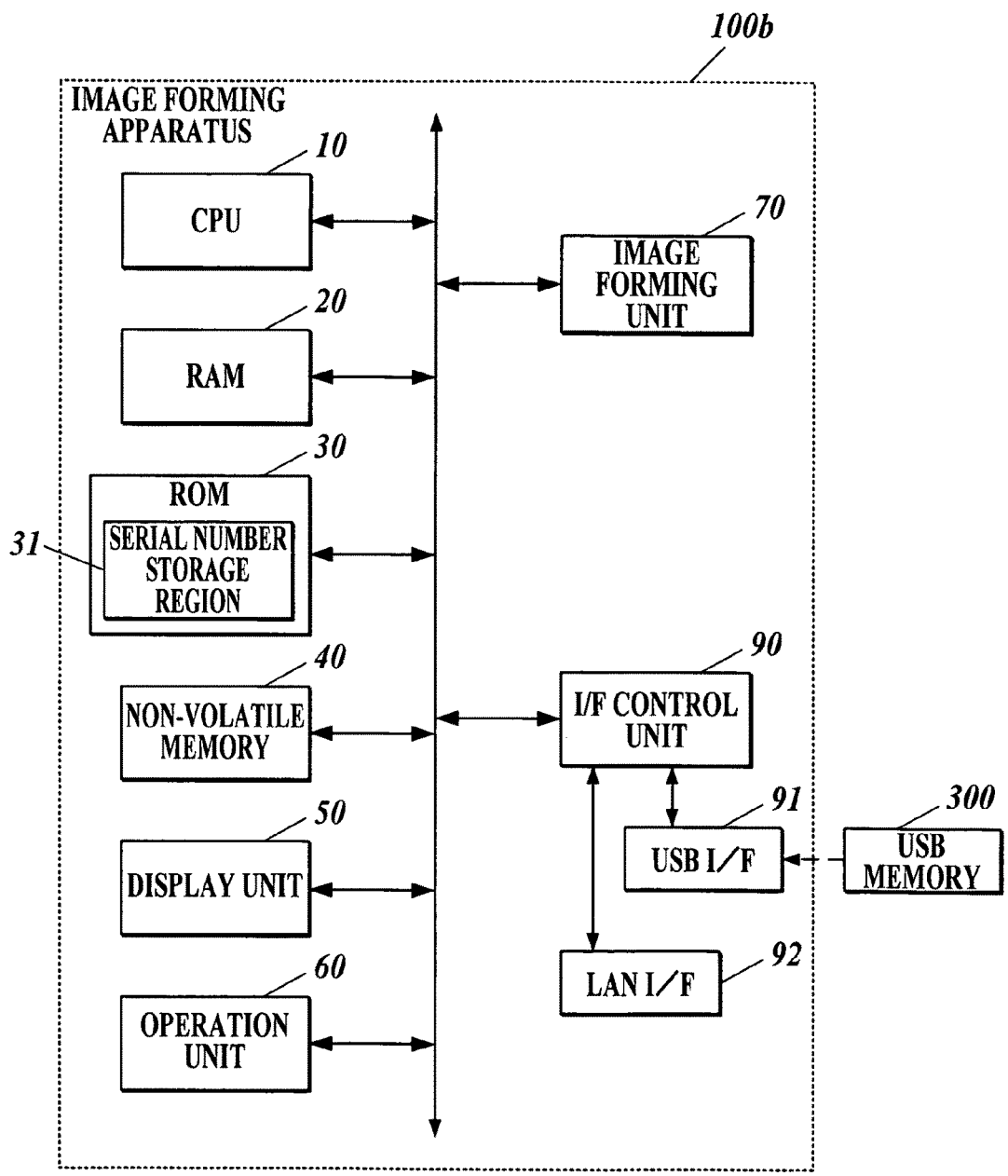
FIG. 3 is a block diagram showing a functional structure of a destination image forming apparatus.

The functional structure of the image forming apparatus 100b is shown in FIG. 3. Because the structure of the image forming apparatus 100b is similar to the structure of the image forming apparatus 100a shown in FIG. 2, the same symbols are used for the same or the corresponding parts and the descriptions are omitted. Here, in the embodiment, it is premised that the HDD 80 loaded in the image forming apparatus 100a is removed and shifted to the image forming apparatus 100b. Therefore, the HDD 80 is not loaded in the image forming apparatus 100b before the HDD 80 is shifted.

The CPU 10 of the image forming apparatus 100b controls the image forming unit 70 based on the print data received from the host PC 200b via the LAN I/F 92 to form an image on a paper.

When the USB memory 300 is inserted in the image forming apparatus 100b, the CPU 10 of the image forming apparatus 100b determines whether the file for authentication is stored in the USB memory 300 or not. The CPU 10 of the image forming apparatus 100b makes the USB memory 300 store the serial number and the apparatus structural information of the image forming apparatus 100b under condition that the file for authentication is stored in the USB memory 300. In particular, when the file for authentication is stored in the USB memory 300 and when the file for authentication contains legitimate content, the CPU 10 of the image forming apparatus 100b reads the serial number of the image forming apparatus 100b from the serial number storage region 31 of the ROM 30, reads the apparatus structural information of the image forming apparatus 100b from the non-volatile memory 40, and makes the USB memory 300 store the serial number and the apparatus structural information of the image forming apparatus 100b.

When the HDD 80 is loaded in the image forming apparatus 100b, the CPU 10 of the image forming apparatus 100b allows the data in the HDD 80 to be used under condition that the serial number of the image forming apparatus 100b is stored in the HDD 80. In particular, the CPU 10 of the image forming apparatus 100b reads the serial number from the serial number storage region 81 of the HDD 80 at the time of start-up of the image forming apparatus 100b and compares to the serial number stored in the serial number storage region 31 of the ROM 30, and the CPU 10 of the image forming apparatus 100b allows the data within the HDD 80 to be used when the serial numbers match.

Next, the operation will be described.

Figure 4:
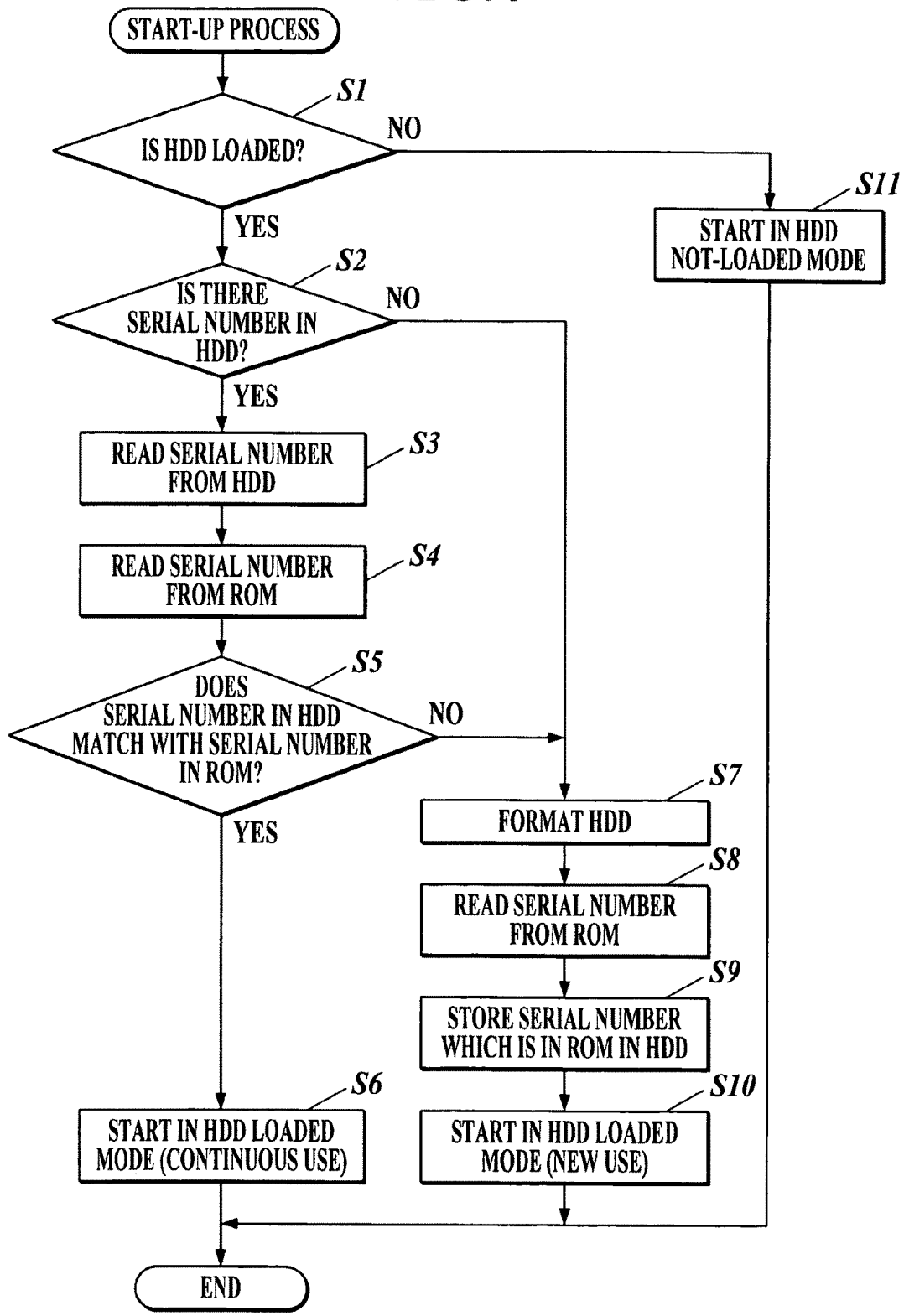
FIG. 4 is a flowchart showing a start-up process.

FIG. 4 is a flowchart showing the start-up process which is executed in each of the image forming apparatuses 100a and 100b. This process is realized by the software process in which the CPU 10 and the programs stored in the ROM 30 of each of the image forming apparatus 100a and the image forming apparatus 100b cooperating with one another. Hereinafter, the description will be given by using the image forming apparatus 100a as an example in order to simplify the explanation. However, a similar treatment is also carried out in the image forming apparatus 100b.

As shown in FIG. 4, the CPU 10 determines whether the HDD 80 is loaded in the image forming apparatus 100a or not (step S1). When the HDD 80 is loaded in the image forming apparatus 100a (step S1; YES), the CPU 10 determines whether the serial number is stored in the serial number storage region 81 of the HDD 80 or not (step S2).

When the serial number is stored in the serial number storage region 81 of the HDD 80 (step S2; YES), the CPU 10 reads the serial number from the serial number storage region 81 of the HDD 80 (step S3) to decode the serial number.

Next, the CPU 10 reads the serial number of the image forming apparatus 100a from the serial number storage region 31 of the ROM 30 (step S4) and determines whether the serial number in the HDD 80 matches with the serial number in the ROM 30 (step S5).

When the serial number in the HDD 80 matches with the serial number in the ROM 30 (step S5; YES), the CPU 10 allows the image forming apparatus 100a to be started in the HDD loaded mode and allows the data in the HDD 80 to be continually used in the image forming apparatus 100a (step S6). Then, the start-up process is finished.

In step S2, when the serial number is not stored in the serial number storage region 81 of the HDD 80 (step S2; NO), that is, when a new HDD 80 is loaded in the image forming apparatus 100a, the CPU 10 formats the HDD 80 (step S7), reads the serial number of the image forming apparatus 100a from the serial number storage region 31 of the ROM 30 (step S8), and encrypts the read serial number of the image forming apparatus 100a to store it in the serial number storage region 81 of the HDD 80 (step S9). Then, the CPU 10 starts the image forming apparatus 100a in the HDD loaded mode and allows the HDD 80 be newly usable in the image forming apparatus 100a (step S10), and the start-up process is finished.

In step S5, when the serial number in the HDD 80 does not match with the serial number of the image forming apparatus 100a in the ROM 30 (step S5; NO), the CPU 10 carries out the process of steps S7 to S10.

In step S1, when the HDD 80 is not loaded in the image forming apparatus 100a (step S1; NO), the CPU 10 starts the image forming apparatus 100a in the HDD not-loaded mode (step S11), and the start-up process is finished.

Next, the process carried out in the destination image forming apparatus 100b and the process carried out in the source image forming apparatus 100a will be described for a case where the HDD 80 loaded in the image forming apparatus 100a is shifted to the image forming apparatus 100b.

Figure 5:
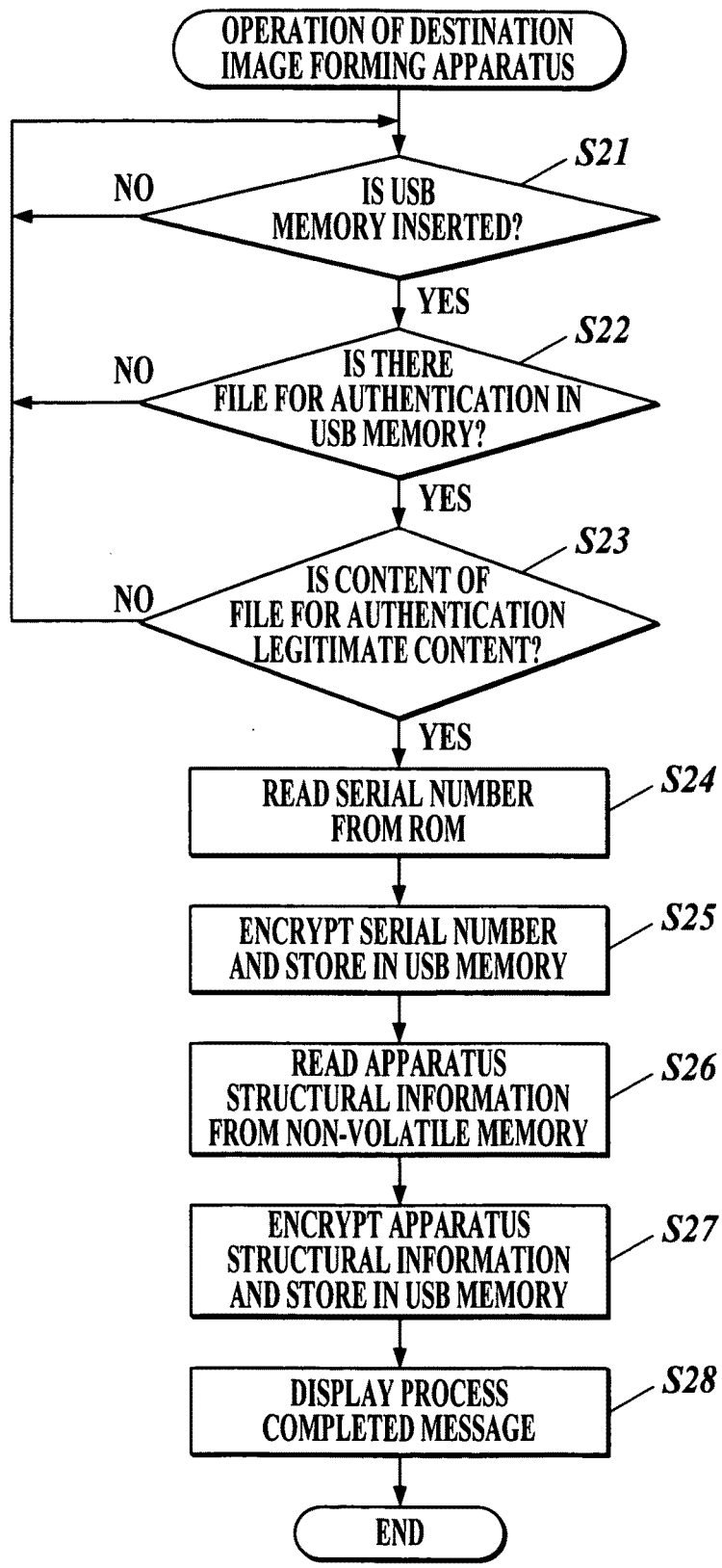
FIG. 5 is a flowchart showing a process which is executed in the destination image forming apparatus.

FIG. 5 is a flowchart showing the process which is executed in the destination image forming apparatus 100b. This process is realized by the software process by the CPU 10 and the program stored in the ROM 30 cooperating with one another.

As shown in FIG. 5, the CPU 10 determines whether the USB memory 300 is inserted in the destination image forming apparatus 100b or not (step S21). When the USB memory 300 is inserted (step S21; YES), the CPU 10 determines whether the file for authentication is stored in the USB memory 300 or not (step S22). When the file for authentication is stored in the USB memory 300 (step S22; YES), the CPU 10 determines whether the content of the file for authentication which is stored in the USB memory 300 is legitimate content or not (step S23).

When the USB memory 300 is not inserted (step S21; NO) in step S21, when the file for authentication is not stored in the USB memory 300 (step S22; NO) in step S22 and when the content of the file for authentication is not legitimate content (step S23; NO) in step S23), the process returns to step S21.

When the content of the file for authentication is legitimate content (step S23; YES) in step S23, the CPU 10 reads the serial number of the destination image forming apparatus 100b from the serial number storage region 31 of the ROM 30 (step S24). Then, the CPU 10 encrypts the serial number of the image forming apparatus 100b to store it in the USB memory 300 (step S25).

Next, the CPU 10 reads the apparatus structural information of the destination image forming apparatus 100b from the non-volatile memory 40 (step S26). Then, the CPU 10 encrypts the apparatus structural information of the image forming apparatus 100b to store it in the USB memory 300 (step S27).

Thereafter, the CPU 10 displays the processes completed message which indicates that the process is completed in the display unit 50 (step S28).

This is the end of the process in the destination image forming apparatus 100b.

After the serial number and the apparatus structural information is stored in the USB memory 300 in the image forming apparatus 100b, a user inserts the USB memory 300 in the image forming apparatus 100a.

Figure 6:
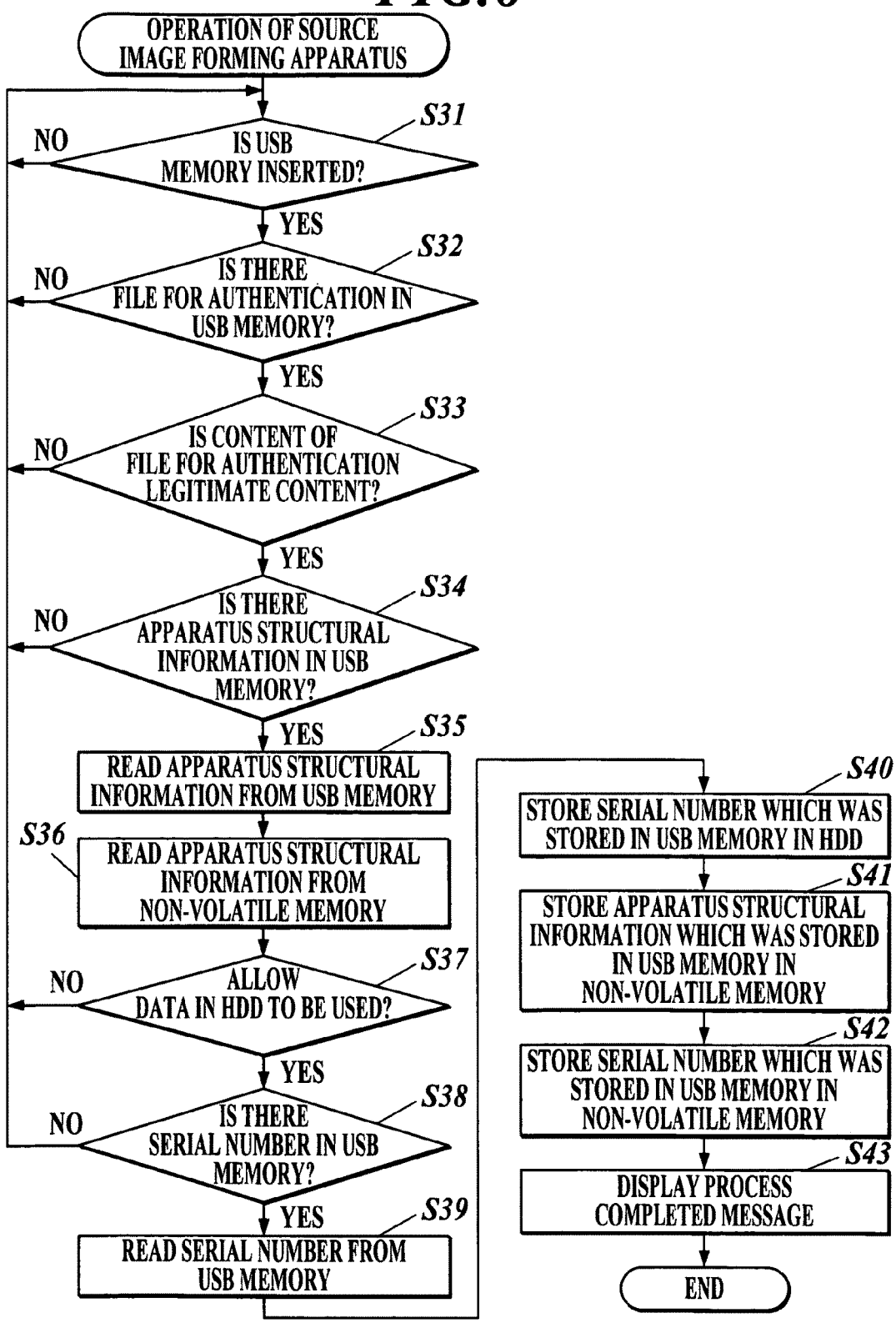
FIG. 6 is a flowchart showing a process which is executed in the source image forming apparatus.

FIG. 6 is a flowchart showing the process which is executed in the source image forming apparatus 100a. This process is realized by the software process in which the CPU 10 and the programs stored in the RPM 30 of the image forming apparatus 100a cooperating with one another.

As shown in FIG. 6, the CPU 10 determines whether the USB memory 300 is inserted or not in the source image forming apparatus 100a (step S31). When the USB memory 300 is inserted (step S31; YES), the CPU 10 determines whether the file for authentication is stored in the USB memory 300 or not (step S32). When the file for authentication is stored in the USB memory 300 (step S32; YES), the CPU 10 determines whether the content of the file for authentication which is stored in the USB memory 300 is legitimate content or not (step S33).

When the content of the file for authentication which is stored in the USB memory 300 is legitimate content (step S33; YES), the CPU 10 determines whether the apparatus structural information is stored in the USB memory 300 or not (step S34). When the apparatus structural information is stored in the USB memory 300 (step S34; YES), the CPU 10 reads the apparatus structural information of the destination image forming apparatus 100b from the USB memory 300 (step S35) and decodes the apparatus structural information.

Next, the CPU 10 reads the apparatus structural information of the source image forming apparatus 100a is read from the non-volatile memory 40 (step S36) and the apparatus structural information is obtained. Then, when the HDD 80 is loaded in the destination image forming apparatus 100b, the CPU 10 determines whether to allow the data in the HDD 80 to be used in the image forming apparatus 100b or not (step S37) based on the apparatus structural information of the image forming apparatus 100b which is read from the USB memory 300 and the apparatus structural information of the image forming apparatus 100a which is obtained from the non-volatile memory 40. In particular, the CPU 10 compares the apparatus structural information of the destination image forming apparatus 100b to the apparatus structural information of the source image forming apparatus 100a, and the CPU 10 determines whether to allow the data in the HDD 80 to be used or not based on the information such as resolution, print speed, color or monochromic and the like.

When the data in the HDD 80 is allowed to be used in the image forming apparatus 100b (step S37; YES), the CPU 10 determines whether the serial number is stored in the USB memory 300 or not (step S38).

When the USB memory 300 is not inserted in step S31 (step S31; NO), when the file for authentication is not stored in the USB memory 300 in step S32 (step S32; NO), when the content of the file for authentication is not legitimate content in step 33 (step S33; NO), when the apparatus structural information is not stored in the USB memory 300 in the step S34 (step S34; NO), when it is determined that the data in the HDD 80 is not allowed to be used in the image forming apparatus 100b in step S37 (step S37; NO) and when the serial number is not stored in the USB memory 300 in step S38 (step S38; NO), the process returns to step S31.

When the serial number is stored in the USB memory 300 in step S38 (step S38; YES), the CPU 10 reads the serial number of the image forming apparatus 100b from the USB memory 300 (step S39) and decodes the serial number. Then, the CPU 10 encrypts the serial number of the image forming apparatus 100b which is stored in the USB memory 300 instead of the serial number of the image forming apparatus 100a, and stores the encrypted serial number in the serial number storage region 81 of the HDD 80 (step S40).

Next, the apparatus structural information of the image forming apparatus 100b which is stored in the USB memory 300 is stored in the non-volatile memory 40 by the CPU 10 (step S41). Then, the serial number of the image forming apparatus 100b which is stored in the USB memory 300 is stored in the non-volatile memory 40 by the CPU 10 (step S42).

Thereafter, the CPU 10 displays the process completed message indicating that the process is completed in the display unit 50 (step S43).

This is the end of the process in the source image forming apparatus 100a.

When it is determined that the data in the HDD 80 is allowed to be used in the image forming apparatus 100a by the above process, the serial number in the HDD 80 loaded in the image forming apparatus 100a is changed to the serial number which corresponds to the image forming apparatus 100b. Therefore, when the start-up process shown in FIG. 4 is executed in the image forming apparatus 100b after the HDD 80 which was loaded in the image forming apparatus 100a is removed and loaded in the image forming apparatus 100b, the serial number in the HDD 80 and the serial number in the ROM 30 match to one another (step S5; YES) in step S5 of FIG. 4 and the data in the HDD is allows to be continually used in the image forming apparatus 100b (step S6).

As described above, in the first embodiment, whether to allow the data in the HDD 80 to be used in the image forming apparatus 100b or not can be appropriately determined based on the apparatus structural information of the image forming apparatus 100b which is read from the USB memory 300 and the apparatus structural information of the image forming apparatus 100a which is obtained from the non-volatile memory 40 in the source image forming apparatus 100a after storing the serial number and the apparatus structural information of the image forming apparatus 100b in the USB memory 300 in the destination image forming apparatus 100b in advance when the HDD 80 is to be shifted to the image forming apparatus 100b from the image forming apparatus 100a.

Moreover, the serial number and the apparatus structural information of the destination image forming apparatus 100b can be referred to in the source image forming apparatus 100a afterwards by storing the serial number and the apparatus structural information of the destination image forming apparatus 100b in the non-volatile memory 40 of the source image forming apparatus 100a.

Furthermore, the safely can be assured because the delivering and receiving of the data is allowed after the authentication is carried out by using the USB memory 300 in each of the destination image forming apparatus 100a and the source image forming apparatus 100a.

Second Embodiment

Next, the second embodiment of the present invention will be described with reference to FIGS. 7 to 10.

Figure 7:
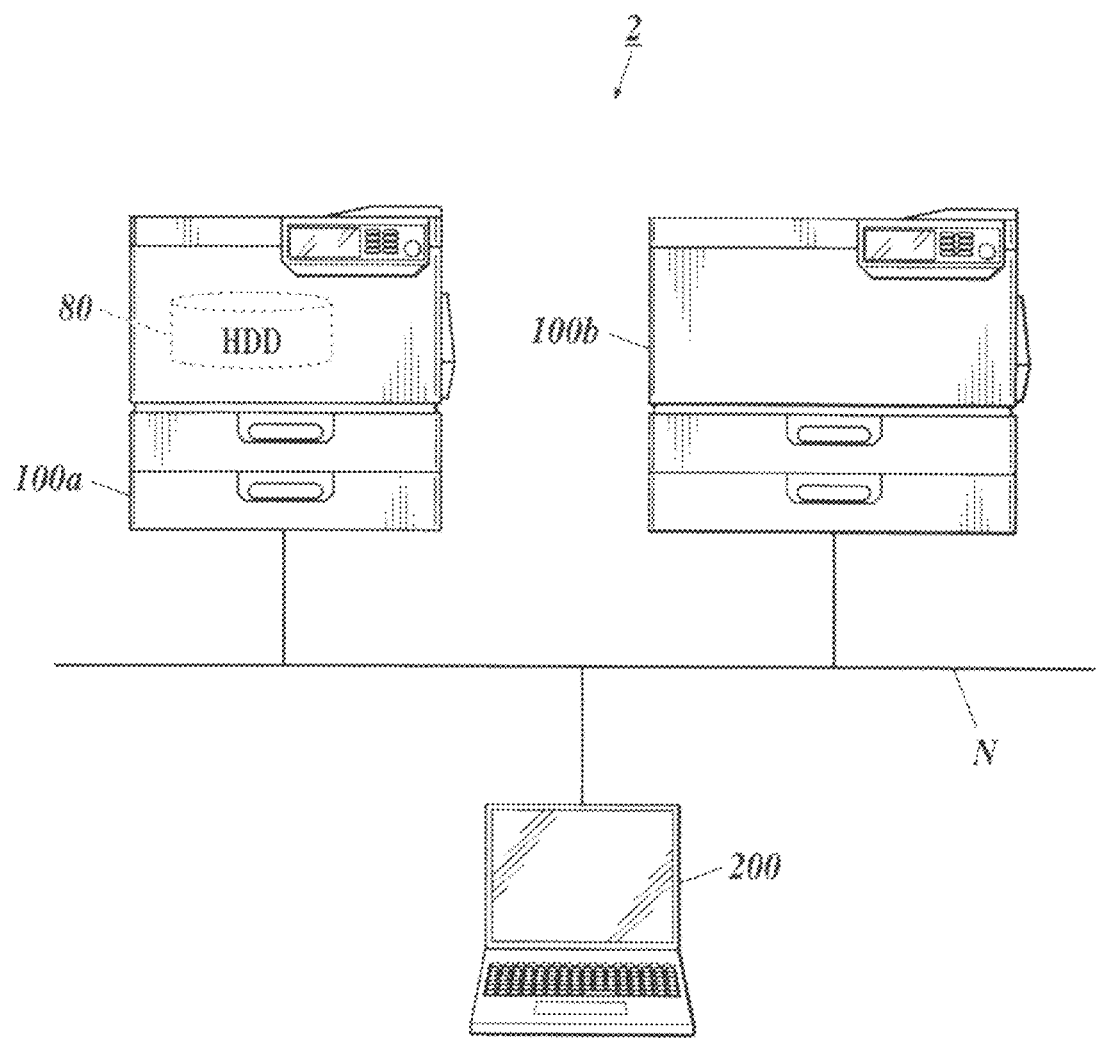
FIG. 7 is a system structural diagram of an image forming system in a second embodiment.

The system structure of the image forming system 2 in the second embodiment is shown in FIG. 7. As shown in FIG. 7, the image forming system 2 comprises the image forming apparatuses 100a, 100b and the host PC 200, and each of the apparatuses are connected via the communication network N such as the LAN or the like so as to carry out data communication.

In the first embodiment, a case where the USB memory 300 is used for the delivering and receiving of the data of the serial number and the apparatus structural information of the image forming apparatus 100b is described. However, in the second embodiment, the delivering and receiving of data is carried out through the communication network N, and the USB memory 300 is only used for the purpose of authentication.

The image forming apparatuses 100a, 100b in the second embodiment have same structure as the image forming apparatuses 100a, 100b shown in the first embodiment. Therefore, FIGS. 2 and 3 are used and the description is omitted. In the second embodiment, the image forming apparatuses 100a, 100b form an image on a paper based on the print data which is transmitted from the host PC 200. Hereinafter, the structure and the process which are distinctive to the second embodiment will be described.

The CPU 10 of the image forming apparatus 100a allows the data in the HDD 80 to be used under condition that the serial number of the image forming apparatus 100a is stored in the HDD 80. In particular, the CPU 10 of the image forming apparatus 100a encrypts the serial number stored in the serial number storage region 31 of the ROM 30 in advance and stores the encrypted serial number in the serial number storage region 81 of the HDD 80, and at the time of start-up of the image forming apparatus 100a, the CPU 10 of the image forming apparatus 100a reads the serial number from the serial number storage region 81 of the HDD 80 and compares the data in the HDD 80 to be used when the serial number read from the serial number storage region 81 of the HDD 80 to the serial number stored in the serial number storage region 31 of the ROM 30. When the serial numbers match to one another, the CPU 10 of the image forming apparatus 100a allows the data in the HDD 80 to be used.

When the USB memory 300 is inserted in the image forming apparatus 100a, the CPU 10 of the image forming apparatus 100a determines whether the file for authentication is stored in the USB memory 300 or not. The CPU 10 of the image forming apparatus 100a obtains the serial number and the apparatus structural information of the image forming apparatus 100*b* from the image forming apparatus 100*b* via the communication network N under condition that it is confirmed that the file for authentication is stored in the USB memory 300. In particular, when the file for authentication is stored in the USB memory 300 and when the content of the file for authentication is legitimate content, the CPU 10 of the image forming apparatus 100*a* enters the special mode for the HDD shifting and transmits the packet specifically for response request to request the serial number and the apparatus structural information of the image forming apparatus 100*b* to the image forming apparatus 100*b*.

The CPU 10 of the image forming apparatus 100*a* reads and obtains the apparatus structural information of the image forming apparatus 100*a* from the non-volatile memory 40. Then, the CPU 10 of the image forming apparatus 100*a* determines whether to allow the data in the HDD 80 to be used in the image forming apparatus 100*b* or not based on the apparatus structural information of the image forming apparatus 100*b* which is obtained from the image forming apparatus 100*b* and the apparatus structural information of the image forming apparatus 100*a* which is obtained from the non-volatile memory 40. In particular, the CPU 10 of the image forming apparatus 100*a* compares the apparatus structural information of the image forming apparatus 100*b* to the apparatus structural information of the image forming apparatus 100*a* and determines whether to allow the data in the HDD 80 to be used or not based on the information such as resolution, print speed, color or monochromatic and the like.

When the CPU 10 of the image forming apparatus 100*a* determines to allow the data in the HDD 80 to be used in the image forming apparatus 100*b*, the CPU 10 of the image forming apparatus 100*a* encrypts the serial number of the image forming apparatus 100*b* which is obtained from the image forming apparatus 100*b* and stores the encrypted serial number in the serial number storage region 81 of the HDD 80. Further, the CPU 10 of the image forming apparatus 100*a* makes the non-volatile memory 40 store the serial number and the apparatus structural information of the image forming apparatus 100*b*.

When the USB memory 300 is inserted in the image forming apparatus 100*b*, the CPU 10 of the image forming apparatus 100*b* determines whether the file for authentication is stored in the USB memory 300 or not. The CPU 10 of the image forming apparatus 100*b* transmits the serial number and the apparatus structural information of the image forming apparatus 100*b* to the image forming apparatus 100*a* when the packet specifically for response request is received from the image forming apparatus 100*a* under condition that it is confirmed that the file for authentication is stored in the USB memory 300. In particular, when the file for authentication is stored in the USB memory 300 and when the content of the file for authentication is legitimate content, the CPU 10 of the image forming apparatus 100*b* enters the special mode for HDD shifting and waits to receive the packet specifically for response request from the image forming apparatus 100*a*. Then, when the packet specifically for response request is received from the image forming apparatus 100*a*, the CPU 10 of the image forming apparatus 100*b* reads the serial number of the image forming apparatus 100*b* from the serial number storage region 31 of the ROM 30, reads the apparatus structural information of the image forming apparatus 100*b* from the non-volatile memory 40 and transmits the response packet including the serial number and the apparatus structural information of the image forming apparatus 100*b* to the image forming apparatus 100*a*.

When the HDD 80 is loaded in the image forming apparatus 100*b*, the CPU 10 of the image forming apparatus 100*b* allows the data in the HDD 80 to be used under condition that the serial number of the image forming apparatus 100*b* is stored in the HDD 80. In particular, the CPU 10 of the image forming apparatus 100*b* reads the serial number from the serial number storage region 81 of the HDD 80 at the time of start-up of the image forming apparatus 100*b* and compares the read serial number to the serial number which is stored in the serial number storage region 31 of the ROM 30. When the serial numbers match, the CPU 10 of the image forming apparatus 100*b* allows the data in the HDD 80 to be used.

Next, the operation will be described.

Regarding the start-up process, the description is omitted because the process is similar to the start-up process in the first embodiment (see FIG. 4).

Next, the process in the destination image forming apparatus 100*b* and the process in the source image forming apparatus 100*a* in a case where the HDD 80 which is loaded in the image forming apparatus 100*a* is shifted to the image forming apparatus 100*b* will be described.

Figure 8:
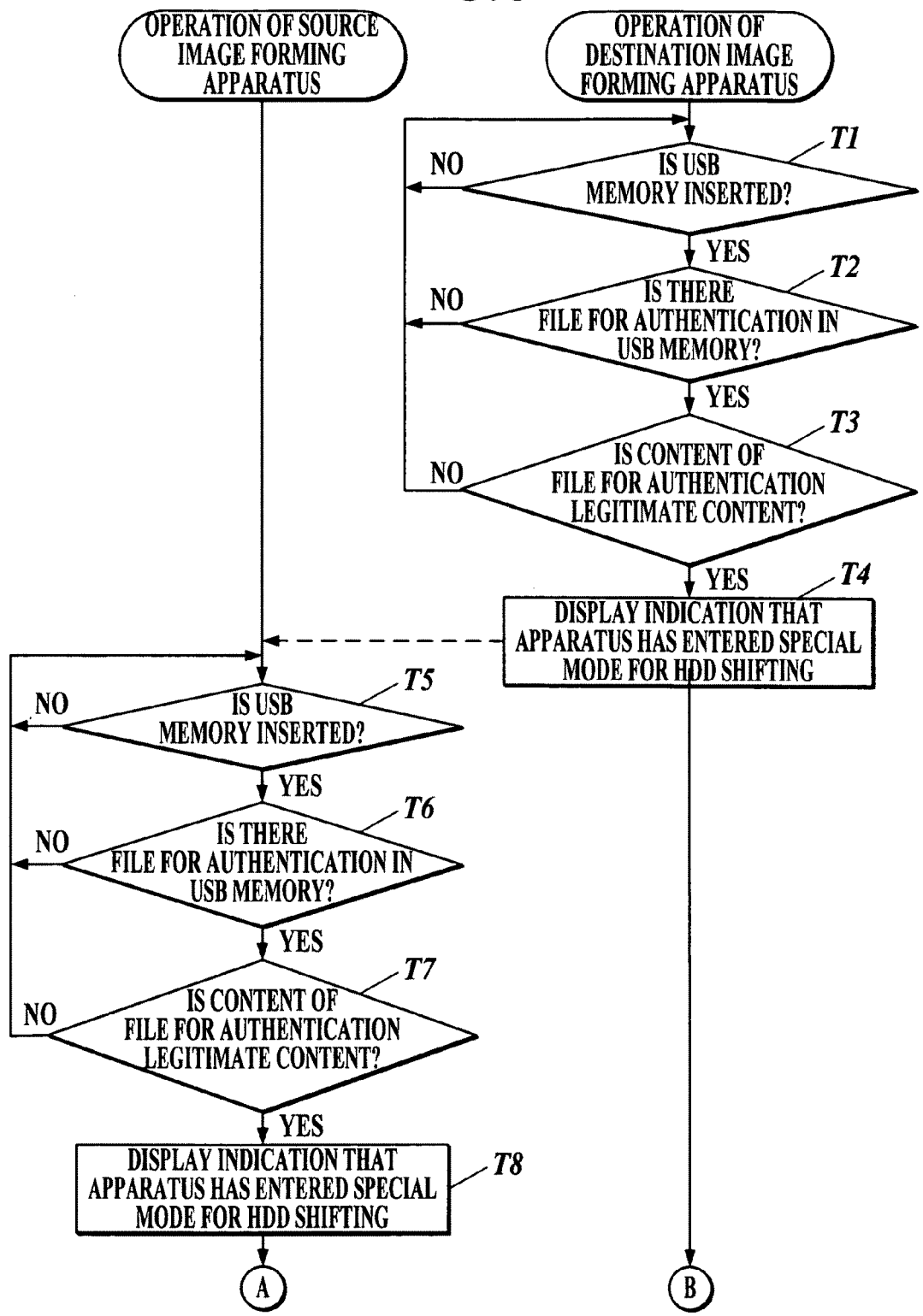
FIG. 8 is a ladder chart showing a process which is executed in the source image forming apparatus and in the destination image forming apparatus.
Figure 9:
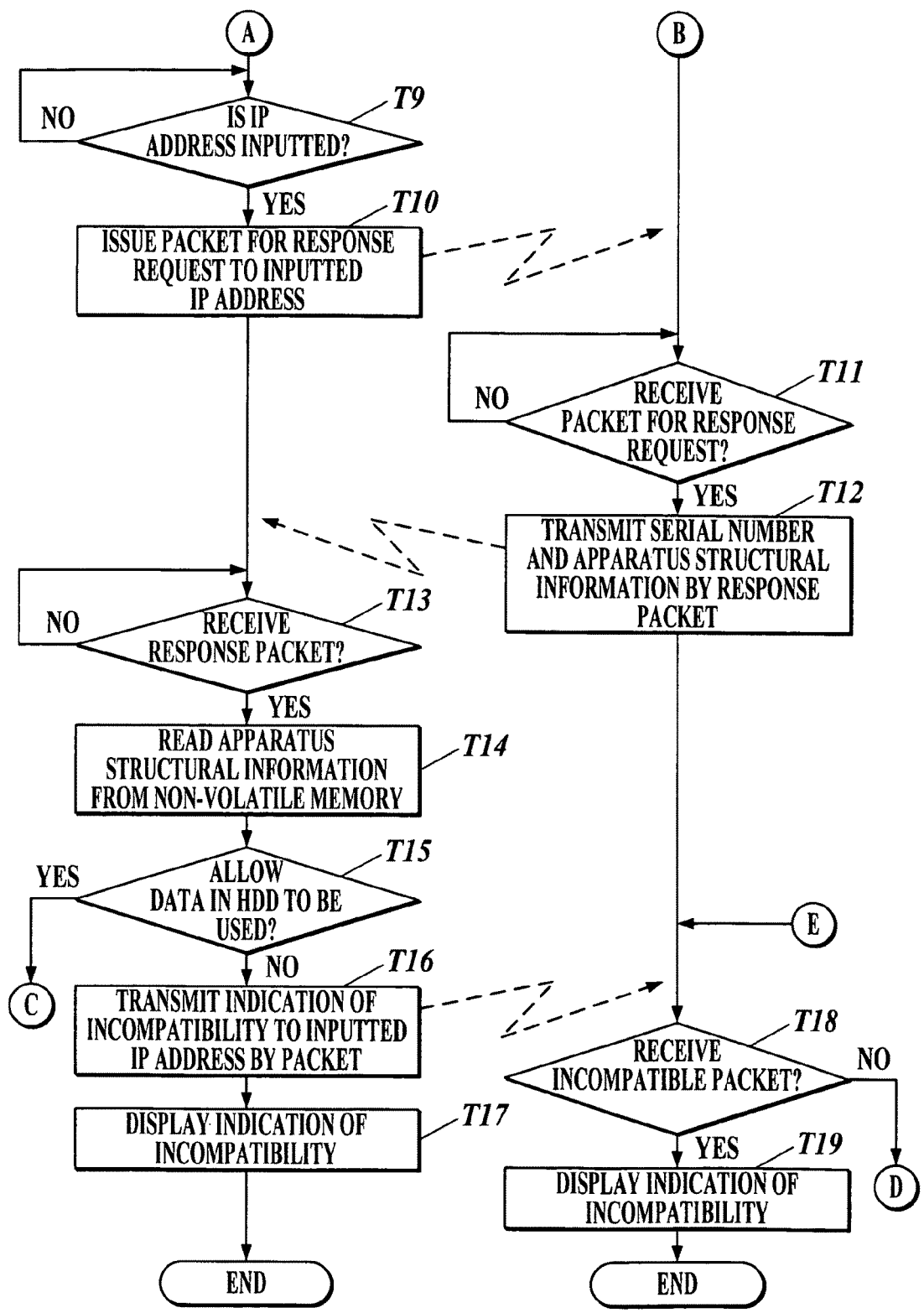
FIG. 9 is a ladder chart showing a process which is executed in the source image forming apparatus and in the destination image forming apparatus.
Figure 10:
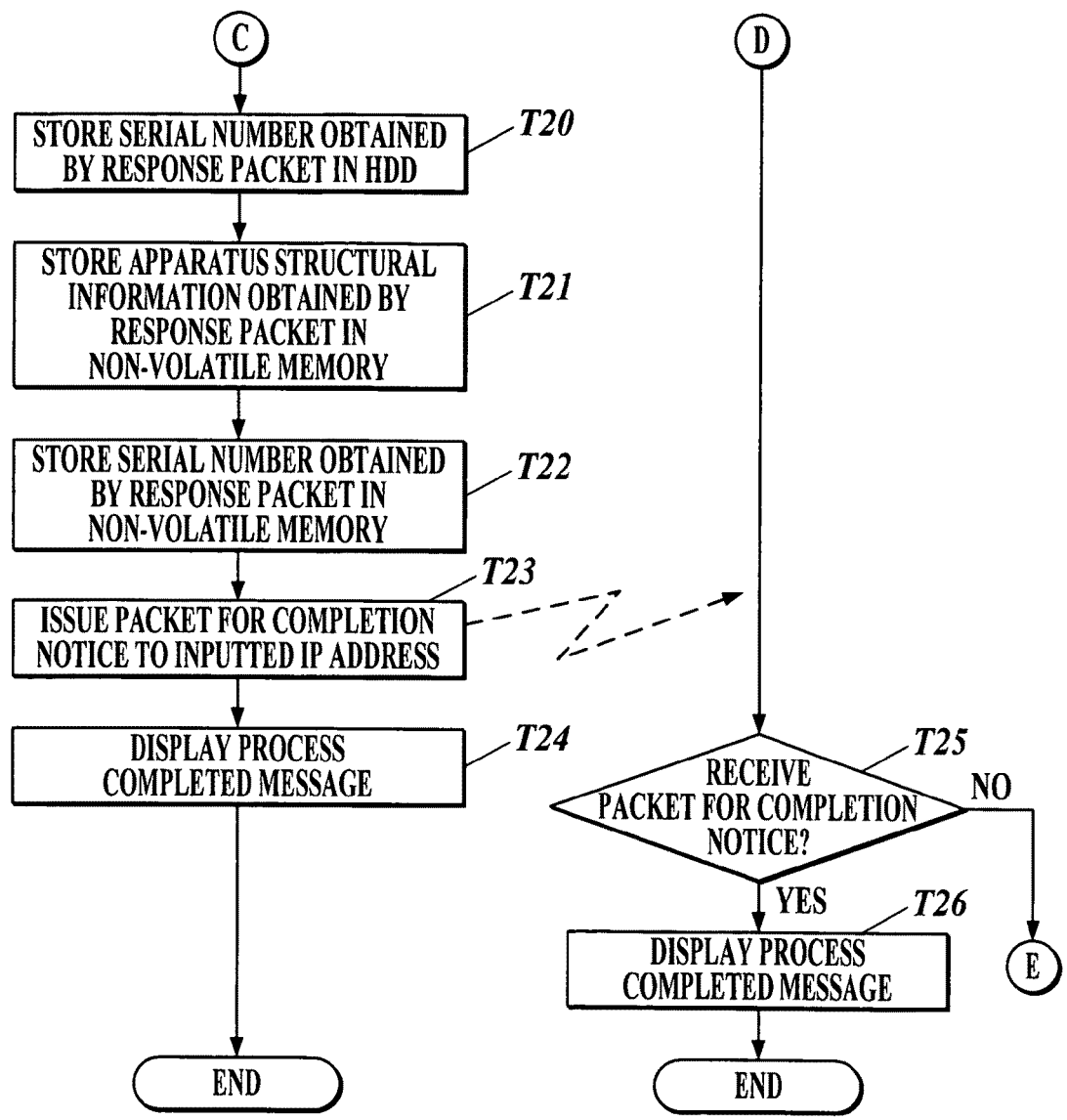
FIG. 10 is a ladder chart showing a process which is executed in the source image forming apparatus and in the destination image forming apparatus.

FIGS. 8 to 10 are ladder charts showing the process which is executed in the source image forming apparatus 100*a* and in the destination image forming apparatus 100*b*. The process in the image forming apparatus 100*a* is realized by the software process by the CPU 10 and the program stored in the ROM 30 of the image forming apparatus 100*a* cooperating with one another. Further, the process in the image forming apparatus 100*b* is realized by the soft wear process by the CPU 10 and the program stored in the ROM 30 of the image forming apparatus 100*b* cooperating with one another.

As shown in FIG. 8, the CPU 10 determines whether the USB memory 300 is inserted or not in the destination image forming apparatus 100*b* (step T1). When the USB memory 300 is inserted in the image forming apparatus 100*b* (step T1; YES), the CPU 10 determines whether the file for authentication is stored in the USB memory 300 or not (step T2). When the file for authentication is stored in the USB memory 300 (step T2; YES), the CPU 10 determines whether the content of the file for authentication which is stored in the USB memory 300 is legitimate content or not (step T3).

When the USB memory 300 is not inserted in the image forming apparatus 100*b* in step T1 (step T1; NO), when the file for authentication is not stored in the USB memory 300 in step T2 (step T2; NO) and when the content of the file for authentication is not legitimate content in step T3 (step T3; NO), the process returns to step T1.

When the content of the file for authentication is legitimate content in step T3 (step T3; YES), the CPU 10 of the image forming apparatus 100*b* displays an indication that the image forming apparatus 100*b* is in the special mode for HDD shifting in the display unit 50 of the image forming apparatus 100*b* (step T4). Then, the image forming apparatus 100*b* will be in a stand-by state for the packet specifically for response request which is to be transmitted from the image forming apparatus 100*a*.

A user takes out the USB memory 300 from the destination image forming apparatus 100*b* and inserts it into the source image forming apparatus 100*a*.

Next, the CPU 10 determines whether the USB memory 300 is inserted or not in the source image forming apparatus 100*a* (step T5). When the USB memory 300 is inserted in the image forming apparatus 100*a* (step T5; YES), the CPU 10 determines whether the file for authentication is stored in the USB memory 300 or not (step T6). When the file for authentication is stored in the USB memory 300 (step T6; YES), the CPU 10 determines whether the content of the file for authentication which is stored in the USB memory 300 is legitimate content or not (step T7).

When the USB memory 300 is not inserted in the image forming apparatus 100*a* in step T5 (step T5; NO), when the file for authentication is not stored in the USB memory 300 in step T6 (step T6; NO) and when the content of the file for authentication is not legitimate content in step T7 (step T7; NO), the process returns to step T5.

When the content of the file for authentication is legitimate content in stet T7 (step T7; YES), the CPU 10 of the image forming apparatus 100*a* makes the display unit 50 of the image forming apparatus 100*a* display an indication that the image forming apparatus 100*a* is in the special mode for HDD shifting (step T8).

Next, moving to FIG. 9, when an IP address of the destination image forming apparatus 100*b* is input from the operation unit 60 in the destination image forming apparatus 100*a* (step T9; YES), the CPU 10 of the image forming apparatus 100*a* issues the packet specifically for response request to request the serial number and the apparatus structural information to the inputted IP address (step T10). That is, the I/F control unit 90 is controlled by the CPU 10 of the image forming apparatus 100*a* and the packet specifically for response request is transmitted to the image forming apparatus 100*b* via the LAN I/F 92. Here, information (IP address and the like) of the destination image forming apparatus 100*b* may be provided to the source image forming apparatus 100*a* by using the utility software from the host PC 200 instead of inputting the IP address of the image forming apparatus 100*b* from the operation unit 60 of the image forming apparatus 100*a*.

Next, in the destination image forming apparatus 100*b*, the CPU 10 determines whether the packet specifically for response request is received via the LAN I/F 92 or not (step T11). When the packet specifically for response request is received in the image forming apparatus 100*b* (step T11; YES), the CPU 10 of the image forming apparatus 100*b* reads the serial number of the image forming apparatus 100*b* from the serial number storage region 31 of the ROM 30 and reads the apparatus structural information of the image forming apparatus 100*b* from the non-volatile memory 40. Then, the I/F control unit 90 is controlled by the CPU 10 of the image forming apparatus 100*b* and the serial number and the apparatus structural information of the image forming apparatus 100*b* are transmitted by a response packet to the image forming apparatus 100*a* via the LAN I/F 92 (step T12).

Next, in the source image forming apparatus 100*a*, the CPU 10 determines whether the response packet is received via the LAN I/F 92 or not (step T13). When the response packet is received in the image forming apparatus 100*a* (step T13; YES), that is, when the serial number and the apparatus structural information of the destination image forming apparatus 100*b* are obtained via the communication network N, the CPU 10 of the image forming apparatus 100*a* reads and obtains the apparatus structural information of the image forming apparatus 100*a* from the non-volatile memory 40 of the image forming apparatus 100*a* (step T14).

Next, when the HDD 80 is loaded in the image forming apparatus 100*b*, the CPU 10 of the image forming apparatus 100*a* determines whether to allow the data in the HDD 80 to be used in the image forming apparatus 100*b* or not (step T15) based on the apparatus structural information of the image forming apparatus 100*b* which is obtained by the response packet and the apparatus structural information of the image forming apparatus 100*a* which is obtained from the non-volatile memory 40. In particular, the CPU 10 compares the apparatus structural information of the source image forming apparatus 100*a* to the apparatus structural information of the destination image forming apparatus 100*b* and determines whether to allow the data in the HDD 80 to be used or not based on the information such as resolution, print speed, color or monochromatic and the like.

When it is determined that the data in the HDD 80 is not allowed to be used in the image forming apparatus 100*b* (step T15; NO), the I/F control unit 90 is controlled by the CPU 10 of the source image forming apparatus 100*a* and an indication that the apparatus structural information of the image forming apparatus 100*b* is incompatible regarding the using of the data in the HDD 80 is transmitted by a packet to the inputted IP address via the LAN I/F 92 (step T16). In the image forming apparatus 100*a*, the CPU 10 displays an indication that the apparatus structural information of the image forming apparatus 100*b* is incompatible regarding the using of the data in the HDD 80 in the display unit 50 (step T17), and the process is finished.

In the image forming apparatus 100*b*, the CPU 10 determines whether the packet indicating the incompatibility is received from the image forming apparatus 100*a* via the LAN I/F 92 or not (step T18) after step 12. When the packet indication the incompatibility is received (step T18; YES) in the image forming apparatus 100*b*, the CPU 10 of the image forming apparatus 100*b* displays an indication that the apparatus structural information of the image forming apparatus 100*b* is incompatible regarding the using of the data in the HDD 80 in the display unit 50 (step T19), and the process is finished.

When it is determined that the data in the HDD 80 is allowed to be used in the image forming apparatus 100*b* in step T15 (step T15; YES), moving to FIG. 10, the CPU 10 of the image forming apparatus 100*a* encrypts the serial number of the image forming apparatus 100*b* which is obtained by the response packet instead of the serial number of the image forming apparatus 100*a*, and the encrypted serial number is stored in the serial number storage region 81 of the HDD 80 (step T20).

Next, the CPU 10 of the image forming apparatus 100*a* stores the apparatus structural information of the image forming apparatus 100*b* which is obtained by the response packet in the non-volatile memory 40 of the image forming apparatus 100*a* (step T21). Next, the CPU 10 of the image forming apparatus 100*a* stores the serial number of the image forming apparatus 100*b* which is obtained by the response packet in the non-volatile memory 40 of the image forming apparatus 100*a* (step T22).

Next, the CPU 10 of the source image forming apparatus 100*a* issues the packet specifically for completion notice which notifies that the operation is completed to the inputted IP address (step T23). That is, the I/F control unit 90 is controlled by the CPU 10 of the image forming apparatus 100*a* and the packet specifically for completion notice is transmitted to the image forming apparatus 100*b* via the LAN I/F 92. Then, the CPU 10 of the image forming apparatus 100*a* displays the process completed message which indicates that the process is completed in the display unit 50 (step T24), and the process is finished.

In the destination image forming apparatus 100*b*, when the packet indicating the incompatibility is not received in step T18 (step T18; NO), moving to FIG. 10, the CPU 10 determines whether the packet specifically for completion notice is received from the image forming apparatus 100*a* via the LAN I/F 92 or not (step T25). When the packet specifically for completion notice is not received from the image forming apparatus 100a (step T25; NO), the process returns to step T18.

When the packet specifically for completion notice is received from the image forming apparatus 100a in step T25 (step T25; YES), the CPU 10 of the image forming apparatus 100b displays the process completed message which indicates that the process is completed in the display unit 50 (step T26), and the process is finished.

When it is determined that the data in the HDD 80 is allows to be used in the image forming apparatus 100b by the above process, the serial number in the HDD 80 which is loaded in the image forming apparatus 100a is changed to a serial number that corresponds to the image forming apparatus 100b. Therefore, when the start-up process shown in FIG. 4 is executed in the image forming apparatus 100b after the HDD 80 which is loaded in the image forming apparatus 100a is removed and is loaded in the image forming apparatus 100b, the serial number in the HDD 80 and the serial number in the ROM 30 match with one another (step S5; YES) in step S5 of FIG. 4 and the data in the HDD 80 is allowed to be continually used in the image forming apparatus 100b (step S6).

As described above, in the second embodiment, whether to allow the data in the HDD 80 to be used in the image forming apparatus 100b can be appropriately determined in the source image forming apparatus 100a in advance based on the apparatus structural information of the image forming apparatus 100b which is obtained from the image forming apparatus 100b via the communication network N and the apparatus structural information of the image forming apparatus 100a which is obtained from the non-volatile memory 40 when the HDD 80 is to be shifted to the image forming apparatus 100b from the image forming apparatus 100a.

Further, by having the serial number and the apparatus structural information of the destination image forming apparatus 100b stored in the non-volatile memory 40 of the source image forming apparatus 100a, the serial number and the apparatus structural information of the destination image forming apparatus 100b can be referred to in the source image forming apparatus 100a afterwards.

Moreover, the safety can be assured because the delivering and receiving of the data is allowed after the authentication is carried out by using the USB memory 300 in each of the destination image forming apparatus 100b and the source image forming apparatus 100a.

Here, the descriptions of the above each embodiment are examples of the image processing apparatus according to the present invention, and the present invention is not limited to this. The detail structure and the detail operation of each part constituting the apparatus can be arbitrarily modified within the scope of the present invention.

For example, in the above each embodiment, a description is given for a case where the print data is received from the host PC 200a, 200b and 200 and where the print controller function to carry out a predetermined image processing to output to the image forming unit 70 is included in the image forming apparatuses 100a, 100b. However, the print controller and the image forming unit 70 may be separated.

Further, in the above each embodiment, the authentication of the USB memory 300 is carried out by storing the file for authentication in the USB memory 300 in advance. However, the authentication may be carried out by the identification information (serial number and the like) specific to the USB memory 300 being registered in the image forming apparatuses 100a, 100b in advance and by each process being received only for the registered USB memory 300. Further, the structure may be such that the USB memory 300 can be used when a supervisor inputs a specific authentication password which is set in advance in the image forming apparatuses 100a, 100b.

In the above description, an example where the ROM is used as a computer readable medium which stores program to execute each processes is disclosed. However, the present invention is not limited to this. The non-volatile memory such as a flash memory and the like and a portable recording medium such as the CD-ROM and the like can be applied as other computer readable medium. Further, a carrier wave can be applied as a medium to provide data of program via the communication circuit.

According to an aspect of the preferred embodiment of the present invention, a data processing method makes a first image processing apparatus allow data in a detachable storage device to be used under a condition that identification information specific to the first image processing apparatus is stored in the storage device when the storage device which is loaded in a second image processing apparatus having a control unit is removed and loaded in the first image processing apparatus, the data processing method comprises reading first image processing apparatus structural information by the control unit from a portable storage medium in which the identification information specific to the first image processing apparatus and the first image processing apparatus structural information are stored, the first image processing apparatus structural information indicating an apparatus structure of the first image processing apparatus, obtaining second image processing apparatus structural information by the control unit, the second image processing apparatus structural information indicating an apparatus structure of the second image processing apparatus itself, determining whether to allow the data in the storage device to be used or not in the first image processing apparatus by the control unit based on the read first image processing apparatus structural information and the obtained second image processing apparatus structural information and reading the identification information specific to the first image processing apparatus by the control unit from the portable storage medium and storing the read identification information specific to the first image processing apparatus in the storage device by the control unit when the control unit determines to allow the data in the storage device to be used in the first image processing apparatus.

In such data processing method, whether to allow the data in the storage device to be used in the destination image processing apparatus or not can be appropriately determined based on the first image processing apparatus structural information and the second image processing apparatus structural information when the storage device is to be shifted between the image processing apparatuses.

Preferably, the data processing method further comprises storing the identification information specific to the first image processing apparatus and the first image processing apparatus structural information by the control unit in a non-volatile storage unit which is provided in the second image processing apparatus.

In such data processing method, the identification information specific to the first image processing apparatus and the first image processing apparatus structural information can be referred to in the second image processing apparatus.

Further, preferably, in the data processing method, the storing of the identification information specific to the first image processing apparatus and the first image processing apparatus structural information in the portable storage medium is carried out under a condition that a predetermined file for authentication is stored in the portable storage medium in the first image processing apparatus, and the reading of the first image processing apparatus structural information from the portable storage medium by the control unit is carried out under a condition that the file for authentication is stored in the portable storage medium in the second image processing apparatus.

In such data processing method, safety can be assured because the data is allowed to be delivered and received after the authentication is carried out by using a predetermined portable storage medium.

Further, according to an aspect of the preferred embodiment of the present invention, a data processing method makes a first image processing apparatus allow data in a detachable storage device to be used under a condition that identification information specific to the first image processing apparatus is stored in the storage device when the storage device which is loaded in a second image processing apparatus having a control unit is removed and loaded in the first image processing apparatus connected to the second image processing apparatus via a communication network so as to carry out a data communication, the data processing method comprises obtaining the identification information specific to the first image processing apparatus and first image processing apparatus structural information by the control unit from the first image processing apparatus via the communication network, the first image processing apparatus structural information indicating an apparatus structure of the first image processing apparatus, obtaining second image processing apparatus structural information by the control unit, the second image processing apparatus structural information indicating an apparatus structure of the second image processing apparatus itself, determining whether to allow the data in the storage device to be used or not in the first image processing apparatus by the control unit based on the obtained first image processing apparatus structural information and the obtained second image processing apparatus structural information and storing the obtained identification information specific to the first image processing apparatus in the storage device by the control unit when the control unit allows the data in the storage device to be used in the first image processing apparatus.

In such data processing method, whether to allow the data in the storage device to be used in the destination image processing apparatus or not can be appropriately determined based on the first image processing apparatus structural information and the second image processing apparatus structural information when the storage device is to be shifted between the image processing apparatuses.

Preferably, the data processing method further comprises storing the identification information specific to the first image processing apparatus and the first image processing apparatus structural information by the control unit in a non-volatile storage unit which is provided in the second image processing apparatus.

In such data processing method, the identification information specific to the first image processing apparatus and the first image processing apparatus structural information can be referred to in the second image processing apparatus.

Further, preferably, in the data processing method, the obtaining of the identification information specific to the first image processing apparatus and the first image processing apparatus structural information by the control unit is carried out under a condition that a predetermined file for authentication is confirmed to be stored in a portable storage medium in each of the first image processing apparatus and the second image processing apparatus.

In such data processing method, safety can be assured because the data is allowed to be delivered and received after the authentication is carried out by using a predetermined portable storage medium.

Further, according to an aspect of the preferred embodiment of the present invention, an image processing apparatus comprises a detachable storage device being loaded in the image processing apparatus and a control unit, and another image processing apparatus which is a destination of the storage device allows data in the storage device to be used under a condition that identification information specific to the another image processing apparatus is stored in the storage device, the control unit reads another image processing apparatus structural information from a portable storage medium in which the identification information specific to the another image processing apparatus and the another image processing apparatus structural information are stored, the another image processing apparatus structural information indicating an apparatus structure of the another image processing apparatus, the control unit obtains image processing apparatus structural information indicating an apparatus structure of the image processing apparatus, the control unit determines whether to allow the data in the storage device to be used or not in the another image processing apparatus based on the read another image processing apparatus structural information and the obtained image processing apparatus structural information, and the control unit reads the identification information specific to the another image processing apparatus from the portable storage medium and stores the read identification information specific to the another image processing apparatus in the storage device when the control unit determines to allow the data in the storage device to be used in the another image processing apparatus.

In such image processing apparatus, whether to allow the data in the storage device to be used in the destination image processing apparatus or not can be appropriately determined based on the another image processing apparatus structural information and the image processing apparatus structural information when the storage device is to be shifted between the image processing apparatuses.

Further, according to an aspect of the preferred embodiment of the present invention, an image processing apparatus comprises a detachable storage device being loaded in the image processing apparatus and a control unit, and another image processing apparatus which is a destination of the storage device is connected to the image process apparatus via a communication network so as to carry out a data communication and allows data in the storage device to be used under a condition that identification information specific to the another image processing apparatus is stored in the storage device, and the control unit obtains the identification information specific to the another image processing apparatus and another image processing apparatus structural information from the another image processing apparatus via the communication network, the another image processing apparatus structural information indicating an apparatus structure of the another image processing apparatus, the control unit obtains image processing apparatus structural information indicating an apparatus structure of the image processing apparatus, the control unit determines whether to allow the data in the storage device to be used or not in the another image processing apparatus based on the obtained another image processing apparatus structural information and the obtained image processing apparatus structural information, and the control unit stores the obtained identification information specific to the another image processing apparatus in the storage device when the control unit determines to allow the data in the storage device to be used in the another image processing apparatus.

In such image processing apparatus, whether to allow the data in the storage device to be used in the destination image processing apparatus or not can be appropriately determined based on the another image processing apparatus structural information and the image processing apparatus structural information when the storage device is to be shifted between the image processing apparatuses.

Further, according to an aspect of the preferred embodiment of the present invention, a computer readable recording medium wherein a detachable storage device is loaded in an image processing apparatus, and another image processing apparatus which is a destination of the storage device allows data in the storage device to be used under a condition that identification information specific to the another image processing apparatus is stored in the storage device, the computer readable recording medium storing a program to make a computer realize function of reading another image processing apparatus structural information from a portable storage medium in which the identification information specific to the another image processing apparatus and the another image processing apparatus structural information are stored, the another image processing apparatus structural information indicating an apparatus structure of the another image processing apparatus, obtaining image processing apparatus structural information indicating an apparatus structure of the image processing apparatus, determining whether to allow data in the storage device to be used or not in the another image processing apparatus based on the read another image processing apparatus structural information and the obtained image processing apparatus structural information, and reading the identification information specific to the another image processing apparatus from the portable storage medium and storing the read identification information specific to the another image processing apparatus in the storage device when the data in the storage device is allowed to be used in the another image processing apparatus.

In such recording medium, whether to allow the data in the storage device to be used in the destination image processing apparatus or not can be appropriately determined based on the another image processing apparatus structural information and the image processing apparatus structural information when the storage device is to be shifted between the image processing apparatuses.

Further, according to an aspect of the preferred embodiment of the present invention, a computer readable recording medium wherein a detachable storage device is loaded in an image processing apparatus, and another image processing apparatus which is a destination of the storage device is connected to the image processing apparatus via a communication network so as to carry out a data communication and allows data in the storage device to be used under a condition that identification information specific to the another image processing apparatus is stored in the storage device, the computer readable recording medium storing a program to make a computer realize function of obtaining the identification information specific to the another image processing apparatus and another image processing apparatus structural information from the another image processing apparatus via the communication network, the another image processing apparatus structural information indicating an apparatus structure of the another image processing apparatus, obtaining image processing apparatus structural information indicating an apparatus structure of the image processing apparatus, determining whether to allow the data in the storage device to be used or not in the another image processing apparatus based on the obtained another image processing apparatus structural information and the obtained image processing apparatus structural information, and storing the obtained identification information specific to the image processing apparatus in the storage device when the data in the storage device is allowed to be used in the another image processing apparatus.

In such recording medium, whether to allow the data in the storage device to be used in the destination image processing apparatus or not can be appropriately determined based on the another image processing apparatus structural information and the image processing apparatus structural information when the storage device is to be shifted between the image processing apparatuses.

The present U.S. patent application claims a priority under the Paris Convention of Japanese patent application No. 2008-157582 filed on Jun. 17, 2008, which shall be a basis of correction of an incorrect translation.

What is claimed is:

1. A data processing method for making a first image processing apparatus allow data in a detachable storage device to be used under a condition that identification information specific to the first image processing apparatus is stored in the storage device when the storage device which is loaded in a second image processing apparatus having a control unit is removed and loaded in the first image processing apparatus, the data processing method, comprising:
reading first image processing apparatus structural information by the control unit from a portable storage medium in which the identification information specific to the first image processing apparatus and the first image processing apparatus structural information are stored, the first image processing apparatus structural information indicating an apparatus structure of the first image processing apparatus;
obtaining second image processing apparatus structural information by the control unit, the second image processing apparatus structural information indicating an apparatus structure of the second image processing apparatus itself;
determining whether to allow the data in the storage device to be used or not in the first image processing apparatus by the control unit based on the read first image processing apparatus structural information and the obtained second image processing apparatus structural information; and
reading the identification information specific to the first image processing apparatus by the control unit from the portable storage medium and storing the read identification information specific to the first image processing apparatus in the storage device by the control unit as a substitute of identification information specific to the second image processing apparatus when the control unit determines to allow the data in the storage device to be used in the first image processing apparatus.

2. The data processing method of claim 1, further comprising:
storing the identification information specific to the first image processing apparatus and the first image processing apparatus structural information by the control unit in a non-volatile storage unit which is provided in the second image processing apparatus.

3. The data processing method of claim 1, wherein
the storing of the identification information specific to the first image processing apparatus and the first image processing apparatus structural information in the portable storage medium is carried out under a condition that a predetermined file for authentication is stored in the portable storage medium in the first image processing apparatus, and the reading of the first image processing apparatus structural information from the portable storage medium by the control unit is carried out under a condition that the file for authentication is stored in the portable storage medium in the second image processing apparatus.

4. The data processing method of claim 1, wherein the storage device is a hard disk drive and the portable storage medium is a USB memory.

5. A data processing method for making a first image processing apparatus allow data in a detachable storage device to be used under a condition that identification information specific to the first image processing apparatus is stored in the storage device when the storage device which is loaded in a second image processing apparatus having a control unit is removed and loaded in the first image processing apparatus connected to the second image processing apparatus via a communication network so as to carry out a data communication, the data processing method, comprising:
obtaining the identification information specific to the first image processing apparatus and first image processing apparatus structural information by the control unit from the first image processing apparatus via the communication network, the first image processing apparatus structural information indicating an apparatus structure of the first image processing apparatus;

obtaining second image processing apparatus structural information by the control unit, the second image processing apparatus structural information indicating an apparatus structure of the second image processing apparatus itself;

determining whether to allow the data in the storage device to be used or not in the first image processing apparatus by the control unit based on the obtained first image processing apparatus structural information and the obtained second image processing apparatus structural information; and storing the obtained identification information specific to the first image processing apparatus in the storage device by the control unit as a substitute of identification information specific to the second image processing apparatus when the control unit allows the data in the storage device to be used in the first image processing apparatus.

6. The data processing method of claim 5, further comprising:
storing the identification information specific to the first image processing apparatus and the first image processing apparatus structural information by the control unit in a non-volatile storage unit which is provided in the second image processing apparatus.

7. The data processing method of claim 5, wherein
the obtaining of the identification information specific to the first image processing apparatus and the first image processing apparatus structural information by the control unit is carried out under a condition that a predetermined file for authentication is confirmed to be stored in a portable storage medium in each of the first image processing apparatus and the second image processing apparatus.

8. The data processing method of claim 5, wherein the storage device is a hard disk drive.

9. An image processing apparatus, comprising:
a detachable storage device being loaded in the image processing apparatus; and
a control unit, wherein
another image processing apparatus which is a destination of the storage device allows data in the storage device to be used under a condition that identification information specific to the another image processing apparatus is stored in the storage device, the control unit reads another image processing apparatus structural information from a portable storage medium in which the identification information specific to the another image processing apparatus and the another image processing apparatus structural information are stored, the another image processing apparatus structural information indicating an apparatus structure of the another image processing apparatus, the control unit obtains image processing apparatus structural information indicating an apparatus structure of the image processing apparatus, the control unit determines whether to allow the data in the storage device to be used or not in the another image processing apparatus based on the read another image processing apparatus structural information and the obtained image processing apparatus structural information, and the control unit reads the identification information specific to the another image processing apparatus from the portable storage medium and stores the read identification information specific to the another image processing apparatus in the storage device as a substitute of identification information specific to the image processing apparatus when the control unit determines to allow the data in the storage device to be used in the another image processing apparatus.

10. The image processing apparatus of claim 9, wherein the storage device is a hard disk drive and the portable storage medium is a USB memory.

11. An image processing apparatus, comprising:
a detachable storage device being loaded in the image processing apparatus; and
a control unit, wherein
another image processing apparatus which is a destination of the storage device is connected to the image process apparatus via a communication network so as to carry out a data communication and allows data in the storage device to be used under a condition that identification information specific to the another image processing apparatus is stored in the storage device, and the control unit obtains the identification information specific to the another image processing apparatus and another image processing apparatus structural information from the another image processing apparatus via the communication network, the another image processing apparatus structural information indicating an apparatus structure of the another image processing apparatus, the control unit obtains image processing apparatus structural information indicating an apparatus structure of the image processing apparatus, the control unit determines whether to allow the data in the storage device to be used or not in the another image processing apparatus based on the obtained another image processing apparatus structural information and the obtained image processing apparatus structural information, and the control unit stores the obtained identification information specific to the another image processing apparatus in the storage device as a substitute of identification information specific to the image processing apparatus when the control unit determines to allow the data in the storage device to be used in the another image processing apparatus.

12. The image processing apparatus of claim 11, wherein the storage device is a hard disk drive.

13. A computer readable recording medium wherein a detachable storage device is loaded in an image processing apparatus, and another image processing apparatus which is a destination of the storage device allows data in the storage device to be used under a condition that identification information specific to the another image processing apparatus is stored in the storage device, the computer readable recording medium storing a program to make a computer realize function of:

reading another image processing apparatus structural information from a portable storage medium in which the identification information specific to the another image processing apparatus and the another image processing apparatus structural information are stored, the another image processing apparatus structural information indicating an apparatus structure of the another image processing apparatus, obtaining image processing apparatus structural information indicating an apparatus structure of the image processing apparatus, determining whether to allow data in the storage device to be used or not in the another image processing apparatus based on the read another image processing apparatus structural information and the obtained image processing apparatus structural information, and reading the identification information specific to the another image processing apparatus from the portable storage medium and storing the read identification information specific to the another image processing apparatus in the storage device as a substitute of identification information specific to the image processing apparatus when the data in the storage device is allowed to be used in the another image processing apparatus.

14. The computer readable recording medium of claim 13, wherein the storage device is a hard disk drive and the portable storage medium is a USB memory.

15. A computer readable recording medium wherein a detachable storage device is loaded in an image processing apparatus, and another image processing apparatus which is a destination of the storage device is connected to the image processing apparatus via a communication network so as to carry out a data communication and allows data in the storage device to be used under a condition that identification information specific to the another image processing apparatus is stored in the storage device, the computer readable recording medium storing a program to make a computer realize function of:

obtaining the identification information specific to the another image processing apparatus and another image processing apparatus structural information from the another image processing apparatus via the communication network, the another image processing apparatus structural information indicating an apparatus structure of the another image processing apparatus, obtaining image processing apparatus structural information indicating an apparatus structure of the image processing apparatus, determining whether to allow the data in the storage device to be used or not in the another image processing apparatus based on the obtained another image processing apparatus structural information and the obtained image processing apparatus structural information, and storing the obtained identification information specific to the another image processing apparatus in the storage device as a substitute of identification information specific to the image processing apparatus when the data in the storage device is allowed to be used in the another image processing apparatus.

16. The computer readable recording medium of claim 15, wherein the storage device is a hard disk drive.

* * * * *